United States Patent [19]

Bohland

[11] Patent Number: 4,833,765
[45] Date of Patent: May 30, 1989

[54] METHOD AND APPARATUS FOR MECHANICALLY LOCATING A CLOSE-FITTING PART WITHIN A RECEPTACLE

[75] Inventor: Walter J. Bohland, Farmington Hills, Mich.

[73] Assignee: Ford Motor Company, Dearborn, Mich.

[21] Appl. No.: 198,963

[22] Filed: May 26, 1988

[51] Int. Cl.$^4$ .............................. D06H 3/12
[52] U.S. Cl. .................. 29/157.1 R; 29/407; 29/799
[58] Field of Search ............ 29/157.1 R, 407, 799, 29/157.1 A; 137/625.47

[56] References Cited

U.S. PATENT DOCUMENTS

3,952,393 4/1976 Ravenzwaay et al. ............ 29/799 X
4,298,026 11/1981 Ambers ............................ 137/265 X

*Primary Examiner*—Timothy V. Eley
*Attorney, Agent, or Firm*—Joseph W. Malleck; Roger L. May

[57] ABSTRACT

A method of locating a close-fitting part within a receptacle of a body, comprising: (a) providing movement of a carriage within a fixed plane, the carriage having a locator finger and part in known relative spaced relation; (b) floating the body for movement in a plane perpendicular to the fixed plane; (c) locating the receptacle by moving the carriage to effect axial motion of the locator finger at a predetermined spatial station to bring the axis of the receptacle to a fixed known location coincident with the axis of the locator finger; and (d) inserting the part into the receptacle by indexing the carriage along the fixed plane to effect axial insertion of said part into the receptacle at the predetermined spatial station. The axial movement of steps (c) and (d) are coincident within a tolerance of ±0.00005", and the part is preferably a sharp-edged spool valve, and the receptacle is preferably a close-fitting valve opening providing a maximum diametrical clearance of 0.0003 inches. The movement of the carriage is effected by one or more linear motors with high acceleration/deceleration speed.

28 Claims, 8 Drawing Sheets

```
┌─────────────────────────────────────────────────┐
│ provide movement of a carriage within a fixed   │
│ plane, the carriage having a locator finger     │
│ and part in known relative spaced relation      │
└─────────────────────────────────────────────────┘
                         │
┌─────────────────────────────────────────────────┐
│ floating the body for movement in a plane       │
│ perpendicular to the fixed plane                │
└─────────────────────────────────────────────────┘
                         │
┌─────────────────────────────────────────────────┐
│ locating the receptacle of the body by          │
│ moving the carriage to effect motion            │
│ of the locator finger at a predetermined        │
│ spatial station to bring the axis of the        │
│ receptacle to a fixed known location            │
│ coincident with the axis of the locator finger  │
└─────────────────────────────────────────────────┘
                         │
┌─────────────────────────────────────────────────┐
│ inserting the part into the receptacle by       │
│ indexing the carriage along said fixed plane    │
│ bringing the axis of the part coincident        │
│ with the receptacle axis and inserting          │
│ the part along such receptacle axis             │
└─────────────────────────────────────────────────┘
```

METHOD AND APPARATUS FOR MECHANICALLY LOCATING A CLOSE-FITTING PART WITHIN A RECEPTACLE

BACKGROUND OF THE INVENTION

1. Technical Field

This invention relates to the art of assembling precision fitting parts; and, more particularly, it relates to assembly of valve spools into valve openings of an automotive automatic transmission control unit.

2. Discussion of the Prior Art

Automatic mechanical assembly of precision fitting parts requires a method to accurately locate the parts relative to each other so that mating or interfit takes place without interference or contact. One example is the insertion of precisely ground valve spools into an opening having a series of sequentially reducing land diameters within the opening, both the lands and the valve spools being sharp-edged or sharp-shouldered with no chamfer or lead-in edges; such valve spools are used in automatic transmission control units. The valve spools are designed to have a diametrical clearance with the lands of the opening of about 0.0003 inches or less; this is extremely close-fitting. When the valve body is machined to define the land surfaces, the process tolerances of boring may allow the opening location to vary from part to Part as well as permit several of the openings to vary in location within a single part. Such variations often are greater than the designed valve to opening clearance. These transmission control units and valve bodies can reach extremely complex proportions, often having 16 valve openings distributed on several different sides of the control unit. For such complex control units to function properly, with complex fluid pressures communicated throughout its labyrinth of passages, requires careful assembly to assure the valve spools and springs are seated correctly without damage, such as scratching, galling or burrs. Such accurate assembly within a tolerance of 0.0003" is not within the capability of state-of-the-art robots.

Efforts to automate such assembly, which are known to the inventors herein, comprise the use of compliant devices, slave plugs, and vision sensors. Compliant devices require lead-in edges on the valve opening or valve spool to permit off-center mating of the parts; the device responds to side thrust to provide centering. The requirement for lead-in edges frustrates the design of the control unit and must be carried out at slow speeds to avoid damage to the parts during off-center mating.

Slave plugs necessitate extra strokes of the assembly due to the need to stroke the parts together using the slave plug for alignment and again when the actual valve spool is inserted. Due to the possible contact between the slave plug and part, the speed of such assembly method must be undesirably slow to avoid damage.

Vision or laser sensors often use search routines that comprise trial and error to find the correct alignment. The insertion carriage travels to where it believes the opening resides according to a hunt routine. This is not only time-consuming, expensive and complicated, but also is not reliable in precisely locating the opening for precise noncontact alignment.

It is therefore an object of this invention to provide a method and apparatus for locating close-fitting parts within a receptacle which obviates the above problems of the prior art, and additionally is characterized by rapid, simple, reliable and microscale accuracy in carrying out such method. It is also an object of this invention to provide such a method which is adaptable to different types of close-fitting parts for reliable automatic assembly.

SUMMARY OF THE INVENTION

The method aspect of this invention provides for rapid, accurate and nondamaging insertion of close-fitting parts that have diametrical clearances of less than 0.0003 inches. The method is adaptable for parts, such as valve spools, that fit within receptacles, such as complex valve openings, of a control body. The method comprises: (a) providing movement of a carriage within a fixed plane, the carriage carrying a locator finger and a part in known relative spaced relation and orientation; (b) floating the body for movement in a plane perpendicular to the fixed plane; (c) moving such carriage to effect motion of the locator finger at a predetermined spatial station to bring the axis of the receptacle to a fixed known location coincident with the axis of the locator finger; and (d) indexably moving the carriage to effect insertion of the part into the receptacle at the predetermined spatial station.

Floating of the body is effected by securing it to a pallet having an aligning surface; the body is oriented with the axis of its receptacle lying in a plane perpendicular to the aligning surface. The aligning surface is floated by use of a thin air film (i.e., approximately 0.001") in an adjustment plane. The aligning surface may be a flat surface that permits adjustment within a flat horizontal plane, or may be a curvilinear surface or a surface with out-of-plane contours compared to the flat surface, both of the latter promoting alignment in directions beyond the horizontal plane. Preferably, the pallet is locked in place by magnets or vacuum upon completion of step (c).

The axial movement during step (d) is preferably coincident within a repeatable tolerance of ±0.00005", the movement during step (c) can ba carried out by use of one or more linear motors having high acceleration and deceleration speeds. Advantageously, a plurality of parts are inserted into a single receptacle and may comprise several valves and springs, all to be inserted within a cycle time of less than 15 seconds. The carriage may releasably grip a valve by use of vacuum against the end of such valve, and may releasably grip a spring by use of a pneumatically expandable sleeve inserted centrally into such spring.

SUMMARY OF THE DRAWINGS

FIG. 6 is a plan view of the apparatus in FIG. 5;

FIG. 9 is an enlarged view of a portion of FIG. 5 directed to the depending fingers carrying valve and associated parts for insertion.

DETAILED DESCRIPTION AND BEST MODE

Figure 1:
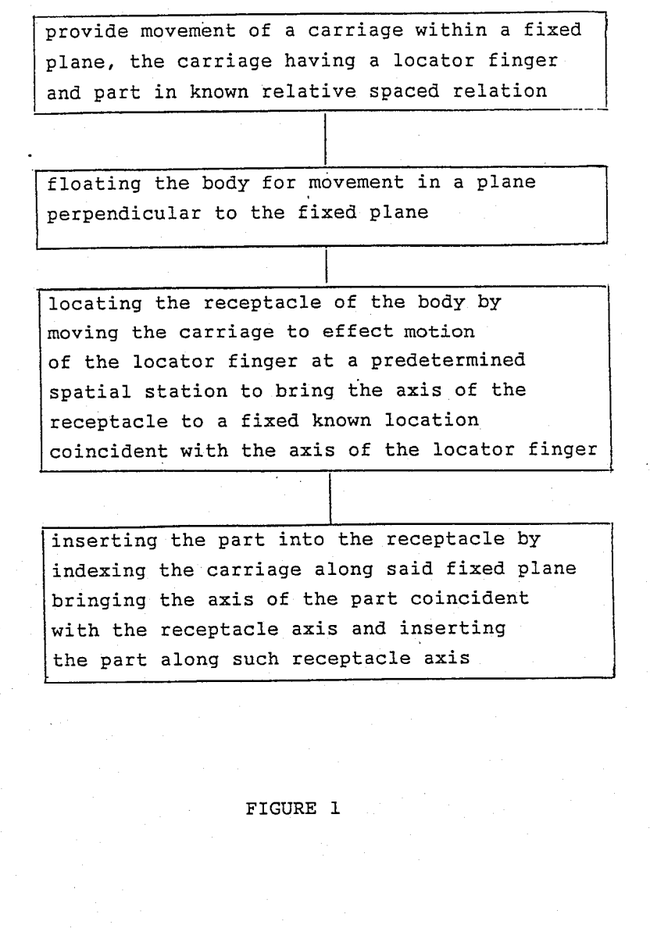
FIG. 1 is a flow diagram of the method aspect of this invention.

As shown in FIG. 1, the method aspect of this invention comprises essentially four steps, including: providing movement of a carriage, floating the body, locating the receptacles of the body at a predetermined spatial station, and inserting one or more parts into the receptacle by bringing the axis of such part into coincidence with the known positioning of the receptacle axis.

Figure 2:
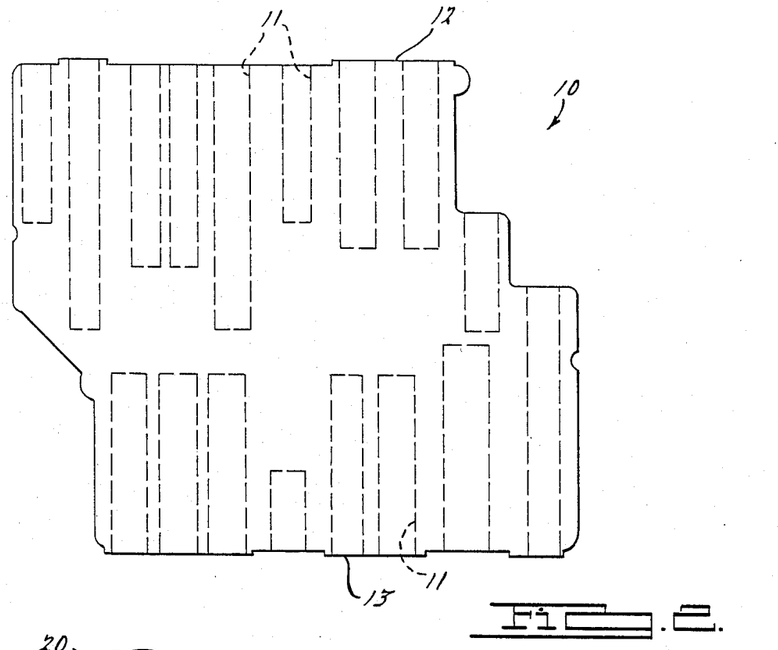
FIG. 2 is a schematic elevational view of a valve body useful as a control unit for an automotive automatic transmission.

Such method is particularly useful in assembling valves, and associated springs or members, into an automotive automatic transmission control unit 10, as shown in FIG. 2, containing a large number of cylindrical receptacles 11 adapted to receive such valves. These receptacles may number as many as 16–20, and may be distributed on at least opposite sides 12 and 13 of the control unit. The control unit is desirably machined from an aluminum body. With its receptacles typically ranging in diameter between ¼" to ¾", the receptacles are machined without chamfers or lead-in shoulders.

Figure 3:
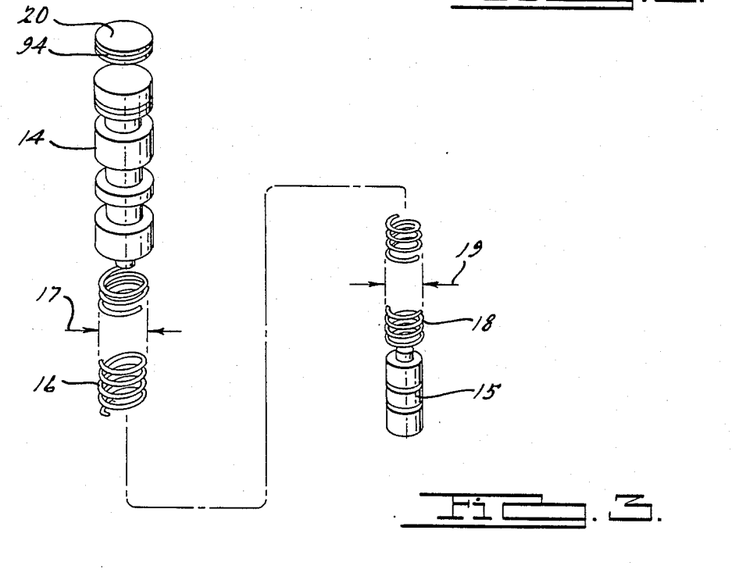
FIG. 3 is an exploded perspective view of a portion of an enlarged valve control unit and associated parts for insertion into one of the receptacles of such control unit.

Each control valve assembly that is inserted into a receptacle 11 may comprise several valves as well as springs and a plug. For example, as shown in FIG. 3, a modulator valve 15 is inserted first into one of the receptacles 11 and placed at the bottom of such receptacle. Thereafter, in sequence, is inserted: (i) a modulator spring 18, of diameter 19, for acting between the ends of the modulator valve and a shift valve 14; (ii) a shift valve spring 16, of diameter 17, for acting between a shoulder of the receptacle and the shift valve itself, and is nested about modulator spring 18; (iii) a shift valve 14 onto the nested springs; and (iv) a plug 20 placed onto the shift valve and secured by a clip 94.

Carriage

Figure 4:
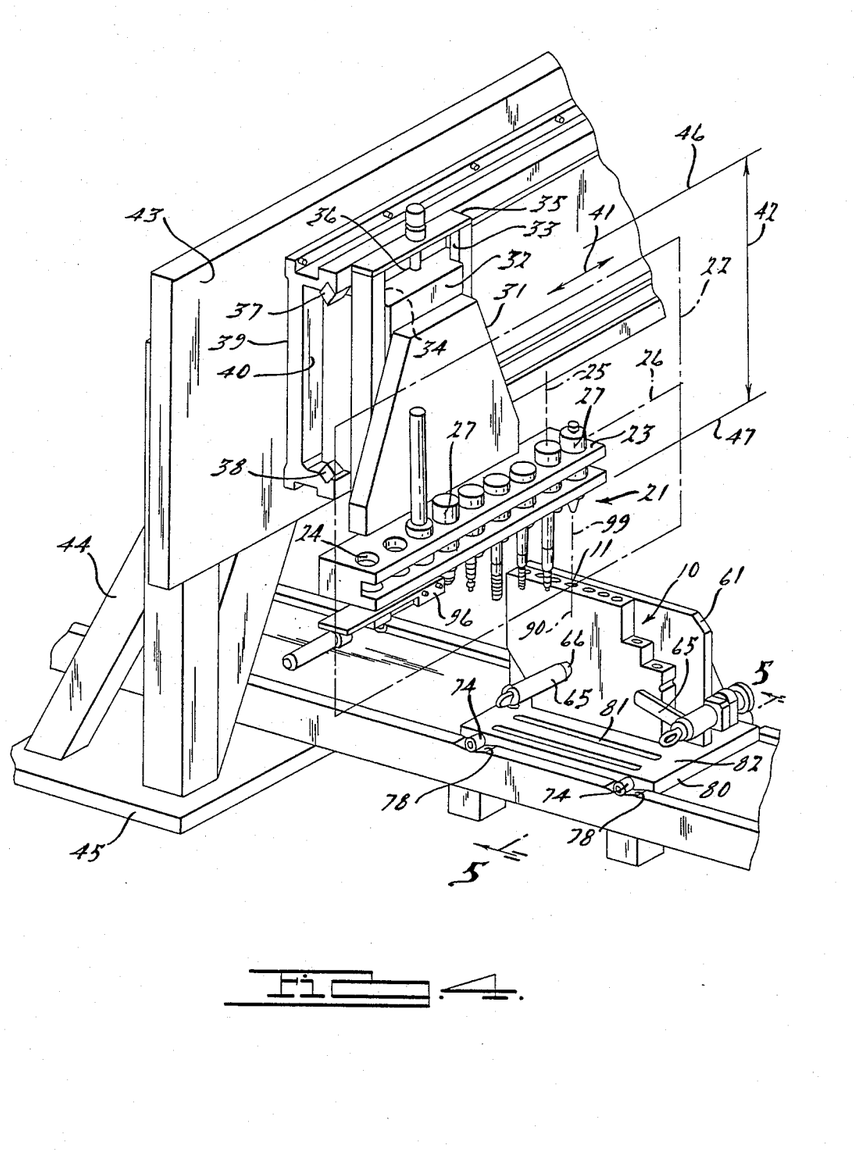
FIG. 4 is a perspective view of an apparatus embodying the apparatus aspects of this invention, and which is effective to carry out the method herein.

As shown in FIG. 4, a carriage 21 is arranged to move in response to actuating motors and within a vertically fixed plane 22. The carriage has a holder block 23 provided with a plurality of openings 24, each of which receive, in a snug-fitting manner, a holder element 27. The openings 24 have their axes 25 aligned in a row 26 and each opening has its axis disposed vertically and lying within plane 22. Each holder element has means 28, i.e., pneumatic line 29, for releasably gripping the end of a spool valve (see FIG. 9), or pneumatic line 30 for expandably gripping the interior of a spring (see FIG. 10) or other equivalent holding apparatus.

The block 23 is supported on an upright plate 31 secured to an armature plate 32 for movement in a vertical direction within a plane parallel to plane 22. The armature plate rides in tracks 33 and 34 of a rectangular frame 35 which supports a linear induction motor for rapid and precise movement in such vertical direction. The frame 35 has secured therein, on its side opposite from plate 31, an armature plate 36 for movement in a horizontal direction 41 and in a plane parallel to plane 22 (or at least is in a direction perpendicular to armature 22). The maximum vertical travel 42 of block 23 is indicated as generally between lines 46 and 47. The armature plate 36 rides in horizontal tracks 37 and 38, the latter being carried on a fixed support 39 which is carried by an upright wall 43 having supports 44 projecting from a pedestal 45. A motor 40, such as a linear motor, is employed to rapidly and accurately position the armature plate 36 along the direction 46 and within a plane parallel to plane 22. A glass scale may be employed with each of these linear motors to precisely determine the instantaneous position of the plates 32 and 36 by virtue of vision imaging or use of lasers, coupled to a computer output (not shown). Alternately, ball screw adjusters may be used at slower speeds, or other means such as air cylinders, in conjunction with hard stops to determine positioning.

The actuating motors should have sufficient linear acceleration/deceleration speed to facilitate a cycle time (for inserting all valve parts and springs into a single bore) in less than a predetermined time period such as about 15 seconds. This requires that all of the fingers 52, 53, 54, 55 and 56 (depending in-line from holder elements 27 of the block) be indexed, inserted and withdrawn, all in a period of less than such 15 seconds.

Figure 5:
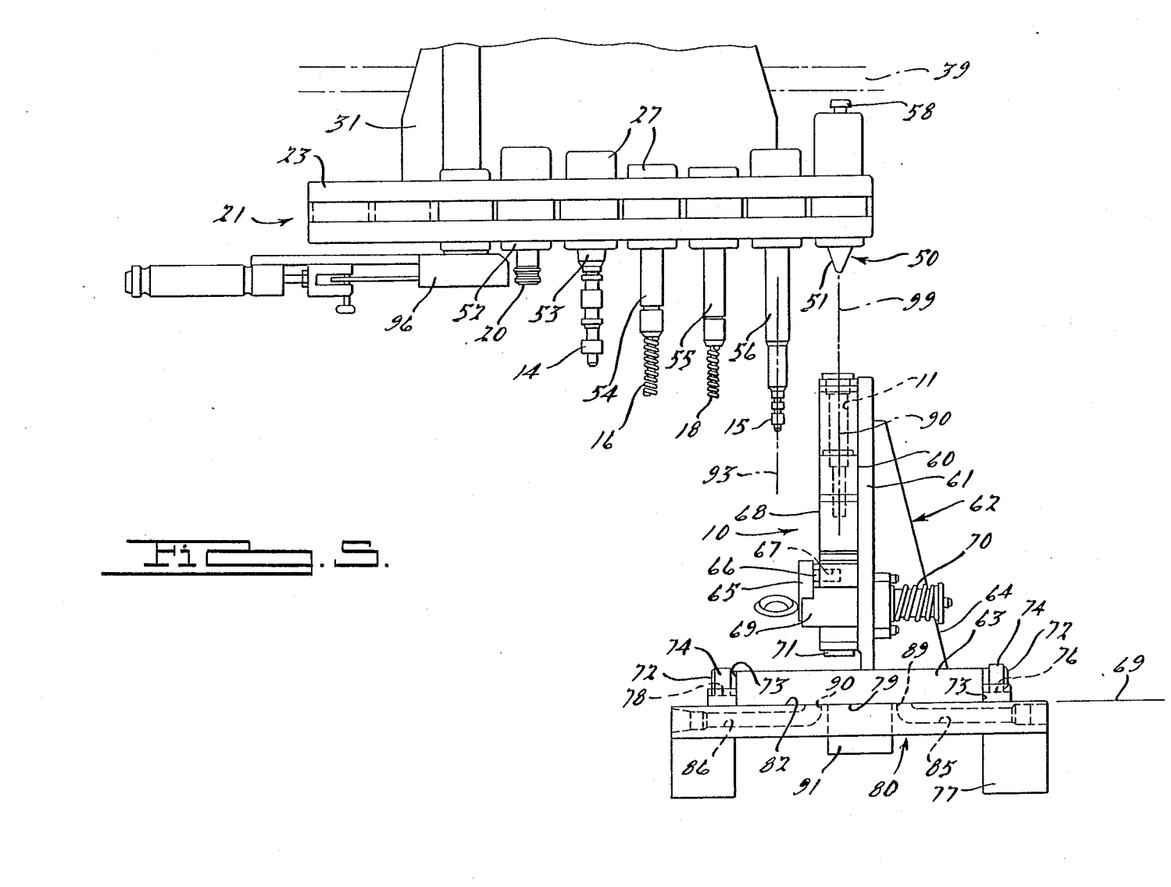
FIG. 5 is an elevational view of the apparatus in FIG. 4, taken along the direction 5—5 of FIG. 4.

As shown in FIG. 5, the holder block 23 has a critical locating finger 50 which carries an aligning surface 51. The finger may be configured as a cone and attached as a hard surface probe element. The finger is secured in the holder element 27 at the end of the row to promote a compact scheme of movements for locating the receptacles and inserting the several parts therein. The locating finger is always at a known spatial position by virtue of carriage 21 being movable between known spatial stations and being in a known spatial relationship to the fixed support 39. The locating finger may also have a vertical compliance device 58 for maintaining contact with the receptacle opening while the body undergoes any settling during location.

Other fingers 52 through 56 depend from the respective holder elements 27 to respectively carry plug 20, close-fitting valve spool 14, coil springs 16,18, and close-fitting valve spools 15 with the axes of the parts coincident with the axis of the supporting holder element. The axes 93 of the fingers are spaced apart a distance 59 of about two inches, which may vary due to port size, surrounding feed devices, and on the reliability of the part pickup and actuating motor effectiveness.

Floatation

The control unit or valve body 10 is suspended by floatation to allow it to move in an X-Y (alignment) plane 69 to conform to the position of the locating finger 50. As shown in FIG. 5, the body or unit 10 is secured along its upright, flat side surface 60 to an upright wall 61 of a pallet 62. The upright wall is supported on a base 63 by webs 64. Such securement is here provided by dual spring-biased arms 65 which have a pin 66 for gripping an opening 67 (provided for this purpose) in side 68 of the control unit. The arms are swingable about a pivot 69 to overlay the body side 68. Each pivot and arm are urged by a spring 70 to draw pin 66 into the opening 67 and thereby clamp the body to the upright wall 61. Bottom 71 of the valve body can be spaced from the base 63 a distance of about one inch.

The base 63 of the pallet has a pair of trunnions 72 projecting outwardly from opposite sides 73 thereof. The trunnions may have rollers 74 thereon to ride on spaced tracks 75,76 supported on a bed 77. Thus, the assembly of the valve control unit, locked to the pallet, may be advanced in a production sequence along bed 77; when the trunnion and rollers drop into detents 78 (best shown in FIG. 4), the pallet and unit is roughly positioned to begin the locating and insertion steps.

Figure 7:
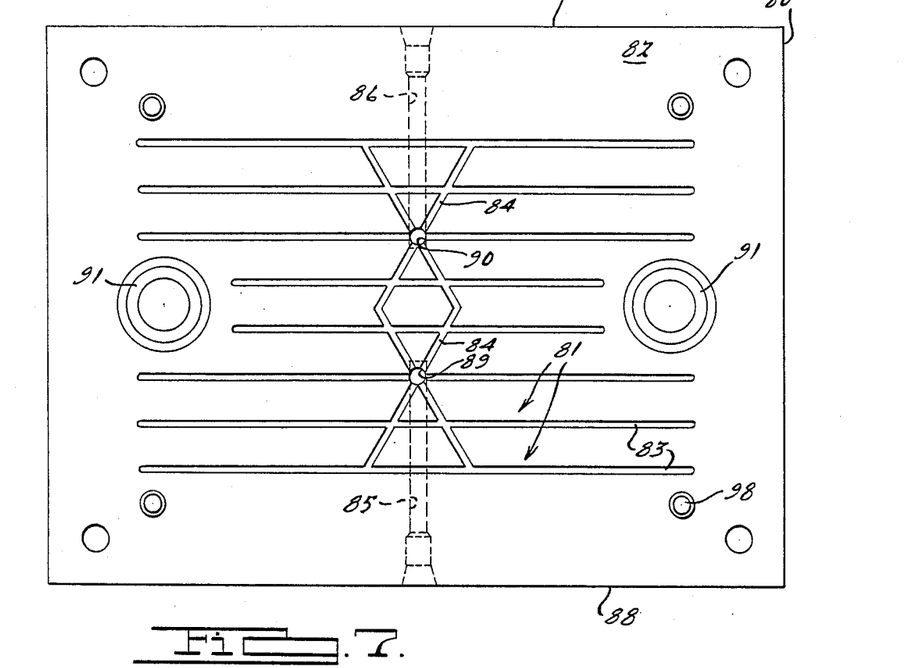
FIG. 7 is an enlarged plan view of an air float plate forming part of the apparatus in FIG. 4.
Figure 8:
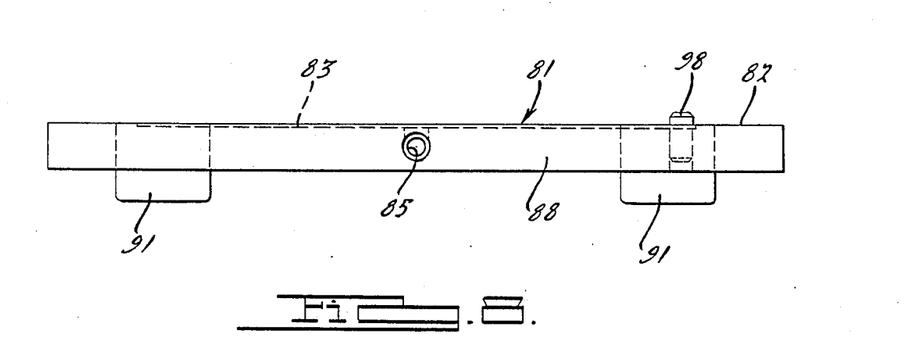
FIG. 8 is a frontal view of the plate of FIG. 7.

An air float fixture 80 is used to suspend the flat bottom surface 79 of the pallet base. As shown in FIGS. 7 and 8, this fixture is a plate placed immediately beneath tracks 75,76 and spans therebetween. The fixture has a pattern 81 of grooves machined in flat top surface 82. Any pattern of grooves may be employed which promotes an adequate air film to float the pallet; here the pattern of grooves is comprised of parallel straight grooves 83 interconnected by cross-angled grooves 84 that form a pair of X's. The grooves may have a depth of about 1/16" and a width of about ⅛". The pattern should desirably extend throughout the area equivalent to the area of bottom surface 79. Air pressure of about 10–40 psi may be fed to the inlets 89 and 90 of such interconnected groove pattern by supply passages 85,86 leading from opposite sides 87,88 of the fixture; the air pressure utilized must be sufficient to generate the desired air film to float the pallet and body with a given weight. The air film created is about 0.001" in thickness and spreads between the base and fixture as it travels to all open edges between such members. Dowels 98 may project from the fixture 80 to seat the tracks 75,76.

Magnets 91 are implanted in fixture 80 at two locations to magnetically lock the pallet in place on fixture 80 when the air film is released and dissipated. Such magnets may be of the electromagnet type capable of delivering high concentrated holding power to clamp the pallet and body. Alternatively, a vacuum may be used to effect the same locking. Moreover, the aligning surface 79 of the pallet and the top surface 82 of the fixture may be curvilinear (i.e., convex base surface and concave fixture surface); this not only provides for adjustment within an X-Y plane, but also provides some degree of orientation in a plane other than the X-Y plane.

Locating The Receptacle

The interconnection between the control unit 10, pallet 62, float fixture 80, trunnions 72, and tracks 75,76 are preengineered to index the receptacle to a position that roughly has axis 90 of the receptacle within ±0.00005" of plane 22 and is parallel to it. The holder block is moved along plane 22 to a predetermined macroscale position with locator finger 50 over the receptacle to be inserted. The precise gauging of the position of armature plates 31 and 36 will bring axis 99 of the locator finger over or close to axis 90. Upon achieving this closeness, the locator finger is lowered to bring conical aligning surface 51 into engagement with the opening to receptacle 11. As the conical surface is further lowered to achieve its complete annular seat against the entire annular edge of the receptacle, the locating finger will cause the axes to become identically coincident by shifting the valve body (or control unit) within the X-Y plane as permitted by the floating air film.

Upon attainment of such coincidence, the air film is released or dissipated, allowing the base 63 of the pallet to settle onto the fixture surface 82. Upon such settlement, magnets 91 will lock the pallet to the fixture retaining such coincidence for further processing.

Inserting Close-Fitting Parts

The holder block 21 is raised to vertically withdraw the locator finger 51 from the receptacle to a height that permits the next finger 56 (carrying a modulator spool valve 15) to be moved horizontally over onto the receptacle without touching the control unit. Since axes 90 and 99 have previously been made coincident and since axis 93 of modulator spool valve is in a known spatial relationship to axis 99, the carriage 21 can be reliably moved to precisely position axis 93 coincident with axis 90 of the receptacle. Upon achieving such coincident alignment, through the use of the gauging system (having position sensors and controls), the block and holder element 27 is lowered to insert the modular spool valve 15 deep into the receptacle 11 without contact with any side of the receptacle. The valve is released upon reaching a predetermined depth by release of vacuum in line 29 and releasing the grip of the holder thereon.

Figure 10:
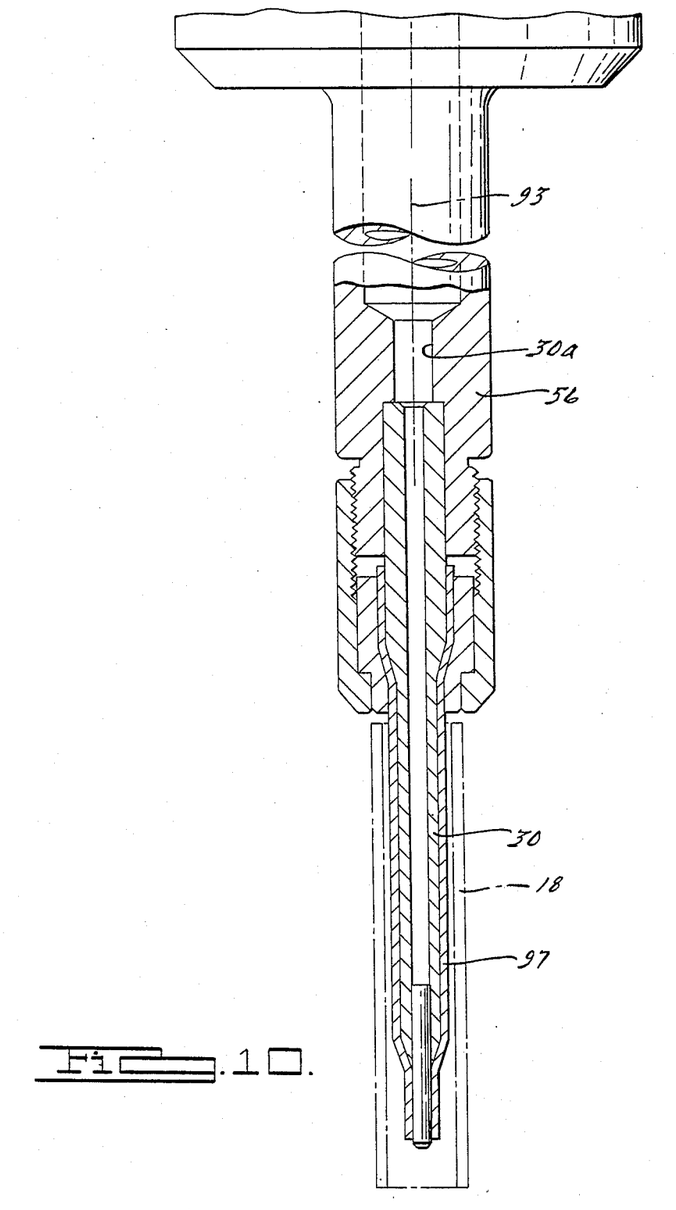
FIG. 10 is an enlarged sectional view of a circled portion of FIG. 9.

This same sequence of raising, side movement, and lowering of the block is performed to bring and insert modulator spring 18 into the receptacle. As shown in FIG. 10, the modulator spring 18 may be gripped on the finger 56 by use of an expandable air sleeve 97 which is connected on a perforated tube 30 which in turn is connected to a pneumatic line 30a for causing gripping of the interior of such spring. Upon insertion of the spring to the desired depth, the release of the air pressure within the expandable air sleeve 97 will cause the spring 18 to be released therefrom permitting the finger 56 to be raised free therefrom.

This same sequence is again repeated for shift spring 16, shift valve 14 and valve retainer plug 20. Upon the insertion of plug 20, a retainer clip may be inserted horizontally into and around the annular groove 94 of the plug. This may be carried out by use of a horizontal insertion movement promoted by loading cartridge 96.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

I claim:

1. A method of locating a close-fitting part within a receptacle of a body, said part and receptacle each having an axis, comprising:
    (a) movably supporting a carriage within a fixed plane, said carriage carrying a locator finger with an axis and a part in predetermined relative spaced relation;
    (b) floating said body for movement in a plane perpendicular to said fixed plane;
    (c) locating said receptacle by moving said carriage to effect motion of the locator finger at a predetermined spatial station to bring the axis of the receptacle to a fixed known location coincident with the axis of said locator finger; and
    (d) inserting said part into said receptacle by indexing the carriage along said fixed plane to effect insertion of said part into said receptacle at said predetermined spatial station.

2. The method as in claim 1, in which said moving required by step (c) is along the axis of the finger and the movement of steps (c) and (d) achieves coincidence within a tolerance of ±0.00005".

3. The method as in claim 1, in which said part is a sharp-edged spool valve and the receptacle is a close-fitting valve opening providing a maximum diametrical clearance of 0.0003 inches.

4. The method as in claim 1, in which said part and receptacle are each cylindrical and in which the insertion of step (d) is carried out axially with respect to said part and receptacle.

5. The method as in claim 1, in which in step (b) said body is mounted on a pallet having a flat surface and said flat surface is floated on an air film.

6. The method as in claim 5, in which said air film is created by a plate upon which said flat surface is superimposed, said plate having air delivery grooves for delivering a supply of air which spreads over said plate to form said air film therebetween.

7. The method as in claim 1, in which in step (b) said body is secured to a pallet having a convex surface, said convex surface being supported in superimposed position on a complementary concave surface with an air film injected therebetween to provide the floating action.

8. The method as in claim 1, in which in step (d) said carriage is moved along said fixed plane to bring the axis of the part coincident with the receptacle axis and thereafter the carriage is moved to insert the part along such receptacle axis.

9. A method of mechanically assembling a part into a body having a micro close-fitting cylindrical receptacle for the part, comprising the steps of:
 (a) securing the body to a pallet having an aligning surface, said body being oriented with the axis of said receptacle lying in a plane perpendicular to the aligning surface;
 (b) floating said aligning surface in an adjustment plane;
 (c) mounting said part on said carriage for movement along an insertion plane disposed perpendicular to the adjustment plane, said carriage having a locating finger depending therefrom with the axis of said finger lying in said insertion plane;
 (d) while stationing at least some portion of said receptacle within said insertion plane, moving said carriage to bring said locating finger into said receptacle along a predetermined line causing the axis of the receptacle to become coincident with the axis of the locating finger;
 (e) locking said pallet and body together within said adjustment plane as located by said locating finger; and
 (f) moving said carriage to insert said part into said locked receptacle along an insertion axis that is coincident with the receptacle axis within a tolerance of 0.00005–0.00015".

10. The method as in claim 9, in which in step (b) said floating is carried out by injecting an air film between said pallet and a float plate.

11. The method as in claim 10, in which said pallet has a flat surface, and said float plate has a flat surface within which grooves are interposed to provide for a flat air film therebetween.

12. The method as in claim 10, in which the surfaces of said pallet and float plate are of complementary curvilinear configuration.

13. The method as in claim 10, in which said air film has a thickness of about 0.001".

14. The method as in claim 9, in which said part has sharp-edged, unchamfered shoulders.

15. The method as in claim 9, in which in step (e) the locking is carried out by the use of magnets upon release of the air film.

16. The method as in claim 9, in which in step (e) said locking is carried out by the use of a vacuum upon release of said air film.

17. The method as in claim 9, in which said pallet has an upright wall to which is clamped a side of said body.

18. The method as in claim 9, in which said carriage is moved by one or more actuating motors to provide a completion or cycle time of less than 15 seconds for insertion of all of the parts into the receptacle.

19. The method as in claim 9, in which said receptacles have a bore diameter in the range of ¼" to ¾" and said body has a plurality of receptacles extending from opposite sides of the body, said method further comprising means for manipulating the body to different sides so that the openings may be exposed to the carriage.

20. The method as in claim 9, in which said carriage has a plurality of depending insert fingers aligned in a row with said locating finger, each of said insert fingers being sequentially indexed into a position having its axis coincident with the axis of said receptacle during step (d) for inserting a plurality of parts into said receptacle.

21. The method as in claim 20, in which certain of said inserting fingers have means for releasably holding the end of a valve spool for insertion.

22. The method as in claim 21, in which said means comprises a pneumatic orifice effective to apply a vacuum force to the end of said spool valve.

23. The method as in claim 20, in which certain of said fingers employ an expandable pneumatic sleeve for gripping certain other of said Parts internally thereof.

24. The method as in claim 9, in which said locating finger has a conically tapered surface for engaging the annular edge of the receptacle opening.

25. The method as in claim 24, in which said locating finger has a vertical compliance means for permitting the locating finger to move with the body during locking in step (e).

26. An apparatus for locating close-fitting parts within a body opening, comprising:
 (a) a carriage movable within a fixed plane carrying a locator finger and a part in predetermined spaced relation and orientation to said locator finger, said carriage being movable to effect an axial motion of the locator finger at a predetermined spatial station to indexably effect axial motion of the part at the same spatial station;
 (b) a float mechanism for floating said body for movement in a plane perpendicular to said fixed plane; and
 (c) means cooperating with said locator finger to bring said body opening to a fixed predetermined location coincident with the axis of the locator fingers to provide microaccurate insertion of the part into said opening when axially moved at the predetermined spatial station.

27. The apparatus as in claim 26, in which means (c) comprises (i) a pallet having an aligning surface, (ii) a float plate with a surface for introducing an air film thereacross, (iii) rails spaced apart for cradling said pallet to a predetermined macroposition, and (iv) means for injecting an air film between said float plate and pallet after said pallet is stationed by said rails.

28. The apparatus as in claim 27, in which said pallet is locked to said float plate upon dissipation of said air film by the use of magnets.

* * * * *